(12) United States Patent
Platon et al.

(10) Patent No.: US 8,936,654 B2
(45) Date of Patent: Jan. 20, 2015

(54) ABSORPTION AND QUENCH METHOD FOR BIOMASS PYROLYSIS PRODUCT

(75) Inventors: Alexandru Platon, Bartlesville, OK (US); Ronald E. Brown, Collinsville, OK (US); Daren E. Daugaard, Skiatook, OK (US)

(73) Assignee: Phillips 66 Company, Houston, TX (US)

(*) Notice: Subject to any disclaimer, the term of this patent is extended or adjusted under 35 U.S.C. 154(b) by 443 days.

(21) Appl. No.: 13/332,916

(22) Filed: Dec. 21, 2011

(65) Prior Publication Data

US 2012/0167452 A1   Jul. 5, 2012

Related U.S. Application Data

(60) Provisional application No. 61/428,601, filed on Dec. 30, 2010.

(51) Int. Cl.
| | | |
|---|---|---|
| C10L 1/00 | (2006.01) | |
| C10C 5/00 | (2006.01) | |
| B01D 53/14 | (2006.01) | |
| C10K 1/04 | (2006.01) | |
| C10K 1/18 | (2006.01) | |

(52) U.S. Cl.
CPC .............. *C10C 5/00* (2013.01); *B01D 53/1487* (2013.01); *B01D 53/1493* (2013.01); *C10K 1/04* (2013.01); *C10K 1/18* (2013.01); *B01D 2252/20* (2013.01); *B01D 2258/05* (2013.01); *Y02E 50/14* (2013.01); *Y02E 50/32* (2013.01)
USPC .............. 44/307; 585/240; 585/242

(58) Field of Classification Search
USPC .................... 44/307; 585/240, 242
See application file for complete search history.

(56) References Cited

U.S. PATENT DOCUMENTS

| 2,535,606 A | 12/1950 | Smith |
|---|---|---|
| 4,206,186 A | 6/1980 | Holter et al. |

FOREIGN PATENT DOCUMENTS

| DE | 3414705 | 10/1985 |
|---|---|---|
| JP | 2003277773 | 10/2003 |
| SE | 523719 | 5/2004 |
| SU | 418461 | 3/1974 |
| WO | 2007128798 | 11/2007 |
| WO | 2009067350 | 5/2009 |

OTHER PUBLICATIONS

Sadaka, Samy, Pyrolysis, 2011, Iowa State Univ, pp. 1-25.*
Jin, Wenlin "Study and development of product separation schemes in MGG and DCC processes", Shiyou Lianzhi Yu Huagong (1994), 25(8), 7-14. CODEN: SLYHEE ISSN: 1005-2399. Journal written in Chinese; Research Institute Petroleum Processing, Beijing, Peop. Rep. China.

(Continued)

*Primary Examiner* — Cephia D Toomer
(74) *Attorney, Agent, or Firm* — Phillips 66 Company (57) ABSTRACT

A biomass pyrolysis product is quenched by direct cooling with a cold quench fluid and initial product separation is performed based on boiling point and solubility in the quench fluid. A properly chosen quench fluid may act as a selective solvent, thus providing dilution of unstable precursors of pyrolytic lignin or other heavy by-products, and/or separation of certain undesirable pyrolysis oil components such as water and light acids.

17 Claims, 2 Drawing Sheets

(56) References Cited

OTHER PUBLICATIONS

Xiandai Huagong, "Advances in study on technologies of fast pyrolysis of biomass for liquid fuels and chemicals production"; Xiandai Huagong (2006), 26(4), 10-14, 16. Publisher: Xiandai Huagong Bianjibu, CODEN: HTKUDJ ISSN: 0253-4320. Journal; General Review written in Chinese. CAN 148:540203 AN 2007:411947 CAPLUS (Copyright (C) 2009 ACS on SciFinder (R)).

Bramer, E.A.; "A new technology for fast pyrolysis of biomass, development of the PyRos reactor" Laboratory of Thermal Engineering, University of Twente, Enschede, Neth. Editor(s): Bridgwater, A. V.

Hague, R.A., The production of selected chemicals from fast pyrolysis of modified biomass feedstocks, Aston University Energy Research Group, UK. Editor(s): Chartier, Philippe; Beenackers, A. A. C. M.; Grassi, G.

Skaates, J. M. "Fast pyrolysis on a molten lead bath" Dep. Chem. Chem. Eng., Michigan Technol. Univ., Houghton, MI, USA.

* cited by examiner

ABSORPTION AND QUENCH METHOD FOR BIOMASS PYROLYSIS PRODUCT

CROSS-REFERENCE TO RELATED APPLICATIONS

This application is a non-provisional application which claims benefit under 35 USC §119(e) to U.S. Provisional Application Ser. No. 61/428,601, filed Dec. 30, 2010, entitled "Absorption and Quench Method for Biomass Pyrolysis Product," which is incorporated herein in its entirety.

STATEMENT REGARDING FEDERALLY SPONSORED RESEARCH OR DEVELOPMENT

None.

FIELD OF THE INVENTION

This invention relates to the treatment of biomass pyrolysis product. More particularly, this invention relates to a process of condensation and phase distribution of biomass pyrolysis oil product.

BACKGROUND OF THE INVENTION

Biomass pyrolysis is a process typically involving thermal decomposition of biomass e.g. ligno-cellulosic biomass (wood, switch grass, corn stover, etc.) under elevated heating rates, to produce a biomass pyrolysis product typically comprising non-condensable gases ($CH_4$, $CO$, $CO_2$), water, a liquid product called pyrolysis oil, and char. The char product is typically separated in a cyclone train. Pyrolysis oil is typically a mixture of condensable vapors as well as particulates—finely divided liquid and semi-liquid droplets and solid particles—carried over through the cyclone train. In order to maximize the liquid product yield, heating rates are preferably higher than the rates at which polycondensation of the reactive intermediates occurs. Following a similar logic, cooling rates for the entire pyrolysis effluent are comparably high.

Pyrolysis oil is extremely reactive upon heating. Attempts to distill it under ambient pressure will typically fail because polycondensation and thermal decomposition reactions become significant even under modest heating. The heavier polycondensation products are usually the most difficult to upgrade to liquid transportation fuels, and pose significant challenges to burner design and fouling prevention when the pyrolysis oil is used directly as a fuel.

The biomass pyrolysis product is typically cooled in trains of short residence time, low transfer area heat exchangers so as to prevent fouling while cooling as quickly as possible. Some form of product separation occurs in these condenser trains based on temperature, although liquid-vapor contact is usually too imperfect to achieve full separation equilibrium.

These designs do not provide a method to continuously dilute or remove deposited or reactive products. As these products accumulate, heat transfer worsens and temperature in the deposited layer increases to the point where polycondensation and thermal decomposition become significant. At the same time, because the heaviest product fraction is usually the most reactive at its condensation point, undesirable polycondensation reactions continue, and are in fact promoted, in the concentrated, warm product film formed in the heat exchangers.

What is needed is a process for recovering the biomass pyrolysis product that provides that both provides a rapid quenching rate for biomass pyrolysis products while minimizing undesired polycondensation and thermal degradation.

BRIEF SUMMARY OF THE DISCLOSURE

Therefore, a direct quench/cooling and absorption method is described here wherein a hot biomass pyrolysis product is contacted with a cold quench fluid in an absorption and quench apparatus.

One embodiment of the invention provides a process comprising:
a) subjecting a biomass feedstock to a pyrolysis treatment to provide a biomass pyrolysis effluent stream comprising i) wet pyrolysis oil comprising liquid pyrolysis oil and water, ii) non-condensable gases, and iii) char; b) separating at least 70% of said char from said biomass pyrolysis effluent stream to form a raw biomass pyrolysis product; c) feeding the raw biomass pyrolysis product into an absorption and quench apparatus; and d) directly contacting the raw biomass pyrolysis product with a cold quench fluid feed in the absorption and quench apparatus, where the raw biomass pyrolysis product is cooled and condensed while at least one separable component from the raw biomass pyrolysis product is absorbed and/or diluted by the cold quench fluid feed.

Another embodiment of the invention provides a quench fluid for quenching, absorbing and/or diluting a raw biomass pyrolysis product comprising a solvent selected from a group consisting of hydrocarbon solvents, substituted hydrocarbon solvents, and any combination thereof.

A further embodiment of the invention provides a method for quenching, absorbing and/or diluting a raw biomass pyrolysis product comprising:
1) feeding said raw biomass pyrolysis product into an absorption and quench apparatus; and 2) directly contacting said raw biomass pyrolysis product with a cold quench fluid feed in said absorption and quench apparatus, where the raw biomass pyrolysis product comprises: i) wet pyrolysis oil comprising liquid pyrolysis oil and water; and ii) non-condensable gases, and where the raw biomass pyrolysis product is cooled and condensed while at least one separable component from the raw biomass pyrolysis product is absorbed, diluted (or both) by the cold quench fluid feed.

We have further discovered that a properly chosen quench fluid may also act as a selective solvent, thus providing dilution of unstable precursors of pyrolytic lignin or other heavy by-products, or separation of certain undesirable pyrolysis oil components such as water and light acids.

In one embodiment, cracked stocks, such as heavy cycle oils or heavy coker gas oils, are selected because they present both the thermal stability and high aromatic content to act both as a direct contact cooling agent and as a selective solvent.

Since the direct contact heat exchange can provide higher heat transfer rates than a typical dual pipe or tube-and-shell heat exchanger, the disclosed inventive design provides faster quenching rates for the hot pyrolysis product and minimizes undesired polycondensation and thermal degradation to a greater extent.

The invention is useful in providing a four-fold benefit to the biomass pyrolysis process: (i) provides fast quenching rates for the hot pyrolysis product in order to prevent undesired polycondensation and thermal degradation; (ii) further prevents polycondensation by instantly diluting reactive components in the pyrolysis product; (iii) enhances product recovery by absorbing or dissolving some of the lighter components that would otherwise escape with the overhead product stream; (iv) facilitates initial product separation into:

water vapor, light oxygenates and non-condensables; a solvent-soluble liquid product; a solvent-insoluble liquid product; a particulate/tar sludge.

BRIEF DESCRIPTION OF THE DRAWINGS

A more complete understanding of the present invention and benefit thereof may be acquired by referring to the following description taken in conjunction with the accompanying drawings in which.

DETAILED DESCRIPTION

Embodiments of the invention relate to a process for treating biomass pyrolysis product. More particularly, this invention relates to a process of condensation and phase distribution of biomass pyrolysis oil product.

Fast pyrolysis of biomass such as ligno-cellulosic biomass produces a biomass pyrolysis effluent stream comprising an aqueous, viscous liquid product (pyrolysis oil) along with char and non-condensable gases. Rapid cooling of the biomass pyrolysis effluent prevents slow polycondensation reactions from building up large molecular weight by-products (pyrolytic lignin or other heavy by-products) in the pyrolysis oil, and is essential for insuring elevated yields of upgradeable liquid product.

Direct contact quenching with a cold quench fluid such as hydrocarbon streams presents the potential of faster cooling rates compared to film-limited cooling as encountered in double-pipe, water-cooled condensers in known technology designs.

We have found that a properly chosen quench fluid may also act as a selective solvent, thus providing dilution of unstable precursors of pyrolytic lignin or other heavy by-products, and/or separation of certain undesirable pyrolysis oil components such as water and light acids.

As used herein, the term "Wet Pyrolysis Oil" is defined as the remaining biomass pyrolysis effluent after the separation of char and non-condensable gases. Therefore, the Wet Pyrolysis Oil contains the liquid pyrolysis oil product and water from the initial biomass feedstock or formed chemically during pyrolysis.

As used herein, the term "Polycondensation" refers to the formation of large molecular weight, polymeric compounds via a chemical reaction between components of the biomass pyrolysis effluent, typically accompanied by the elimination of other small molecule compounds such as water and carbon dioxide.

Figure 1:
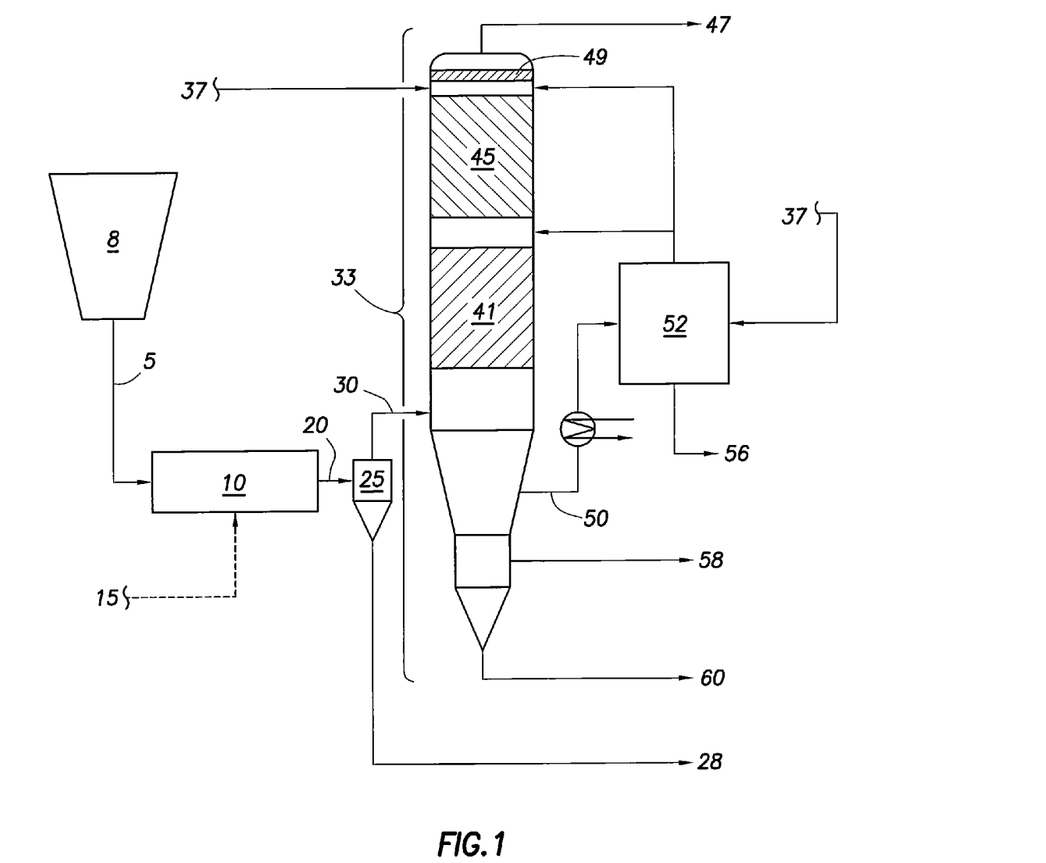
FIG. 1 is a schematic representation of the steps involved in the absorption and quench of biomass pyrolysis product.

With reference now to FIG. 1, a biomass such as ligno-cellulosic biomass 5 is dispensed from a feeder 8 to a pyrolyzer 10 where it is converted into pyrolysis products, either in the presence of external heating 15 or autothermally, to provide a biomass pyrolysis effluent stream 20. The pyrolysis effluent stream 20 typically comprises i) wet pyrolysis oil comprising liquid pyrolysis oil and water; ii) non-condensable gases, and iii) char.

Initial char separation may be employed, because char is thought to promote undesired polycondensation reactions. The separation apparatus 25 useful for the invention may be selected from a group consisting of cyclone, wash column, absorption column, and any combination thereof. In one embodiment, the biomass pyrolysis effluent stream is sent to a separation apparatus for removing at least 70% of the char, with the char 28 either discarded or recycled to the pyrolyzer 10.

The resulting raw biomass pyrolysis product 30 is further sent to an absorption and quench apparatus 33, where the raw biomass pyrolysis product is directly contacted with a cold quench fluid. As a result, the raw biomass pyrolysis product 30 is cooled and condensed, while at least one separable component from said raw biomass pyrolysis product is absorbed and/or diluted by the cold quench fluid feed.

A section of this apparatus 41 may contain wash trays 41, structured packing 45 or combinations thereof to ensure that the heaviest, most reactive fouling precursors are immediately cooled, diluted and washed away by a suitable liquid. An additional section of this apparatus 45 may contain liquid-vapor contacting devices such as packing wash trays or combinations thereof, where further cooling of the vaporized pyrolysis product occurs concomitantly with the condensation or absorption of certain components into a cold quench fluid such as liquid sorbent (solvent), based on vapor pressures and relative solubilities. Water vapor, light oxygenates and non-condensable gases may be removed from the tower 33 via a conduit near the top 47 An optional demister 49 may be placed near the top of the tower to prevent loss of condensed liquids from the tower. The liquid solvent may be recovered 50 and recycled through the system 52 up to a certain pyrolysis product uptake level, and then a draw stream 56 may be sent to a subsequent upgrading or separation unit or plant. Fresh or regenerated solvent 37 may be fed at the top of the absorber and into the recycled solvent storage 52 to maintain the required inventory. Depending on solvent selection and operating temperatures, solvent-soluble and solvent-insoluble phases may form at the bottom of the absorption and quench tower 33, providing additional product separation based on relative partition coefficients.

According to one embodiment of the invention, the temperature of the biomass pyrolysis effluent stream is at least 300° F. (149° C.), and the temperature of the cold quench fluid feed is less than 850° F. (454° C.).

The resulting product streams may be sent for further separation, upgrading and/or solvent regeneration. A stream 58 removed from near the bottom of the tower 33 may comprise insoluble products, while a product 60 removed from the bottom of the tower 33 may comprise a sludge containing entrained char and certain components such as pyrolytic lignin or other heavy by-products. The temperature at the top of the absorption and quench tower 33 may be maintained above the temperature at which the majority of water condenses so as to prevent dilution of the recovered liquid products.

A variety of cold quench fluids may be used to carry out the invention. According to one embodiment of the current disclosure, the cold quench fluid is a solvent selected from a group consisting of hydrocarbon solvents, substituted hydrocarbon solvents, and any combinations thereof.

The selective solvent character of the quench fluid depends on its polar or polarizable character. To exemplify, aromatic hydrocarbons are polarizable and can act as a selective solvent for polar compounds. Polar pyrolysis oil components in the vapor phase that are near their condensation point will preferentially absorb in a solvent selected for its aromatic character. According to one embodiment of the disclosure, the cold quench fluid feed may be a thermally stable aromatic solvent comprising at least 30% aromatic carbon. A non-limiting exemplary aromatic solvent is selected from a group consisting of any aromatic extracts from solvent extraction of vacuum distillates, any sub-fraction thereof, and any combination thereof. Further non-limiting exemplary aromatic solvents are cracked refinery stocks selected from a group consisting of heavy cycle oils, heavy coker gas oils, heavy visbreaking distillates, heavy thermal cracking distillates, clarified catalytic cracking decant oils, any sub-fraction thereof, and any combination thereof.

On the contrary, hydrocarbon mixtures with an aliphatic (that is, non-aromatic) character are largely non-polar. In the presence of a separate aqueous phase, the least polar pyrolysis oil components will dissolve preferentially in a solvent selected for its aliphatic character. According to one embodiment of the disclosure, the cold quench fluid feed may be a thermally stable aliphatic solvent containing equal to or less than 30% aromatic carbon. An exemplary aliphatic solvent is selected from a group consisting of one or more extracts from solvent extraction of vacuum residues. Further, non-limiting exemplary aliphatic solvents are refinery stocks selected from vacuum gas oil; intermediate and heavy vacuum distillates, naphthenic oils, heavy hydrocracker distillates, heavy distillates from hydroprocessing, any sub-fraction thereof, and any combination thereof.

According to the current disclosure, the selective solvent character of the quench fluid also depends on the solvent-to-wet-pyrolysis-oil ratio. Dilution or separation of certain pyrolysis oil components occurs at a variety of solvent-to-wet-pyrolysis-oil ratios, but is best achieved at ratios near or above the critical ratio at which these components begin partitioning preferentially in the solvent phase. In one embodiment, the separable component is absorbed or dissolved in the selected solvent under a solvent-to-wet-pyrolysis-oil ratio equal or greater than a critical ratio of 1:1, where more than 50% of the separable components separate outside the solvent phase. In another embodiment, the solvent to wet-pyrolysis-oil ratio is between 1:100 to 100:1, in still another embodiment, the solvent to wet-pyrolysis-oil ratio is between 1:2 to 20:1.

According to the current disclosure, the separable component is selected from a group consisting of furans, substituted furans, anhydrosugars, phenolic compounds, polyphenolic compounds, carboxylic acids, carboxylates, substituted carboxylic acids, aldehydes, ketones, substituted aldehydes or ketones, alcohols, polyols, substituted alcohols or polyols, water, char, and any chemical or physical combination thereof. According to the current disclosure, the separable component is derived from said wet pyrolysis oil or said char.

The following examples of certain embodiments of the invention are given. Each example is provided by way of explanation of the invention, one of many embodiments of the invention, and the following examples should not be read to limit, or define, the scope of the invention.

EXAMPLE

Model Composition for Raw Pyrolysis Oil

A model composition for raw pyrolysis oil was chosen to contain roughly equal amounts of lignin pyrolysis products (phenolics) and (hemi)cellulose pyrolysis products (carboxylic acids, anhydrosugars, and furanics). The model composition was balanced with 20 wt % water.

TABLE 1

The model compounds chosen and their relative amounts.

| | Model Compound | BP, ° F. | Wt % |
|---|---|---|---|
| Products of lignin pyrolysis | Guaiacol | 401 | 13.3 |
| | pMethoxyPenol | 472 | 13.3 |
| | Lignin Oligomer | 1059* | 13.3 |

TABLE 1-continued

The model compounds chosen and their relative amounts.

| | Model Compound | BP, ° F. | Wt % |
|---|---|---|---|
| Products of (hemi)cellulose pyrolysis | Furfural | 323 | 13.3 |
| | Dilactic Acid | 420 | 13.3 |
| | Acetic Acid | 244 | 13.3 |
| | H$_2$O | 212 | 20.0 |

*estimate

Guaiacol, para-methoxyphenol (PMP), furfural, dilactic acid, and acetic acid were chosen because they are built-in library compounds in process simulators. Any suitable pyrolysis process simulator may be used including but not limited to Aspen HYSYS® or Aspen Plus®. Guaiacol and PMP were chosen to represent products of lignin pyrolysis while furfural, dilactic acid and acetic acid were chosen as placeholders for furanics, anhydrosugars and light carboxylic acids, respectively, because of their similarity in molecular structure and elemental composition. The lignin oligomer having the structure shown below was based on a hypothetical trimer structure comprising one synapyl alcohol and two coniferyl alcohol monomeric units.

The overall composition discussed above is representative of typical raw pyrolysis oil. The elemental composition can be easily calculated and yields 56 wt % C, 6 wt % H, and 38 wt % O on a dry basis.

For comparison, Table 2 exemplifies the effluent composition from pyrolysis as captured by a micropyrolysis-GC/MS apparatus.

TABLE 2

Composition of product from pyrolysis obtained in a micro-pyrolizer-GC/MS apparatus. For simplicity, non-phenolic oxygenates were lumped as anhydro/sugars as a reflection of their originating predominantly from (hemi)cellulose pyrolysis.

| Peak area-based relative abundance | Compound | A—anhydro/sugar; P—phenolic |
|---|---|---|
| 8% | 4-((1E)-3-Hydroxy-1-propenyl)-2-methoxyphenol | P |
| 6% | Phenol, 2,6-dimethoxy- | P |
| 6% | Phenol, 2,6-dimethoxy-4-(2-propenyl)- | P |
| 4% | 2-Methoxy-4-vinylphenol | P |
| 3% | Phenol, 2-methoxy-4-(1-propenyl)-, (E)- | P |
| 2% | 1,2-Benzenediol, 3-methoxy- | P |
| 2% | Phenol, 2-methoxy- | P |
| 2% | Phenol, 2,6-dimethoxy-4-(2-propenyl)- | P |
| 2% | Phenol, 2-methoxy-4-methyl- | P |
| 1% | 1,2-Benzenediol | P |

TABLE 2-continued

Composition of product from pyrolysis obtained in a micro-pyrolizer-GC/MS apparatus. For simplicity, non-phenolic oxygenates were lumped as anhydro/sugars as a reflection of their originating predominantly from (hemi)cellulose pyrolysis.

| Peak area-based relative abundance | Compound | A—anhydro/sugar; P—phenolic |
|---|---|---|
| 1% | Phenol, 2,6-dimethoxy-4-(2-propenyl)- | P |
| 1% | Phenol, 4-ethyl-2-methoxy- | P |
| 1% | 1,2-Benzenediol, 3-methyl- | P |
| 1% | Vanillin | P |
| 1% | 3-Allyl-6-methoxyphenol | P |
| 1% | 1,2-Benzenediol, 4-methyl- | P |
| 1% | 4-((1E)-3-Hydroxy-1-propenyl)-2-methoxyphenol | P |
| 1% | Benzene, 1,2,3-trimethoxy-5-methyl- | P |
| 1% | Phenol, 2-methoxy-4-(1-propenyl)- | P |
| 15% | Acetic acid | A |
| 6% | Levoglucosan (β-D-Glucopyranose, 1,6-anhydro-) | A |
| 5% | Cyclopentanone, 2-methyl- | A |
| 3% | 3-Cyclobutene-1,2-dione, 3,4-dihydroxy- | A |
| 2% | Benzaldehyde, 4-hydroxy-3,5-dimethoxy- | A |
| 2% | Furfural | A |
| 2% | 2(5H)-Furanone | A |
| 2% | 1,2-Cyclopentanedione, 3-methyl- | A |
| 2% | 3,5-Dimethoxy-4-hydroxyphenylacetic acid | A |
| 2% | Ethanone, 1-(4-hydroxy-3,5-dimethoxyphenyl)- | A |
| 2% | 3,5-Dimethoxy-4-hydroxycinnamaldehyde | A |
| 1% | 2-Furanmethanol | A |
| 1% | 2-Furancarboxaldehyde, 5-methyl- | A |
| 1% | Ethanone, 1-(4-hydroxy-3-methoxyphenyl)- | A |
| 1% | 1,4:3,6-Dianhydro-α-d-glucopyranose | A |
| 3% | Methenamine | |
| 1% | 3-Buten-1-amine, N,N-diethyl- | |
| 1% | 5-Isopropyl-2,4-dioxo-1,2,3,4-tetrahydro-pyrimidine | |

Estimation of Properties and Phase Equilibrium Behavior

Process simulators such as HYSYS and Aspen Plus have built-in libraries of measured properties that are useful in estimating energy balances and liquid-vapor phase transition in mixtures upon cooling and condensation. Intermolecular interaction parameters and liquid-phase activity coefficients useful in characterizing liquid-liquid equilibrium can be estimated based on the molecular structure of each compound and its derivatives using the UNIFAC method described in Fredenslund, A.; R. L. Jones; J. M. Prausnitz; Group-Contribution Estimation of Activity Coefficients in Nonideal Liquid Mixtures. AIChE Journal, 21 (1975) 1086, which is incorporated herein by reference.

Compounds not already parameterized within the simulation software, as is the case with the lignin oligomer compound mentioned above, can be characterized satisfactorily when their molecular structure is known and estimates for their critical properties and heat of formation are available. Some of the critical and point properties that were not directly estimated by the simulator were calculated separately using the software package ProPred described in Gani, R. et al; ICAS version 12.0 and ProPred version 3.5; Computer Aided Process Engineering Center, Denmark Technical University, 2009, which is incorporated herein by reference.

The acentric factor was back-calculated using the method described by Nath as described in Nath, J.; Ind Eng Chem Fudnam 21 (1982) 325; DOI: 10.1021/i100007a023, which is incorporated herein by reference.

Phase transition and equilibrium calculations were completed in Aspen Plus using the UNIFAC-LL property package which is appropriate for vapor-liquid-liquid equilibrium problems. UNIFAC structural groups were generated as shown in Table 3, and provided to the simulator for the non-library lignin oligomer structure discussed above.

TABLE 3

UNIFAC group assignment for lignin oligomer

| Group | Counts | Description |
|---|---|---|
| 1350 | 2 | Aromatic⟩C—OH |
| 1105 | 8 | Aromatic⟩C—H |
| 1100 | 5 | Aromatic⟩C— |
| 1005 | 3 | ⟩CH— |
| 1200 | 4 | —OH |
| 1010 | 5 | —CH$_2$— |
| 1605 | 1 | ⟩CH—O— |
| 1615 | 4 | CH$_3$—O— |
| 1150 | 1 | Aromatic⟩C—CH< |
| 1155 | 2 | Aromatic⟩C—CH$_2$— |

Simulated Quenching.

Figure 2:
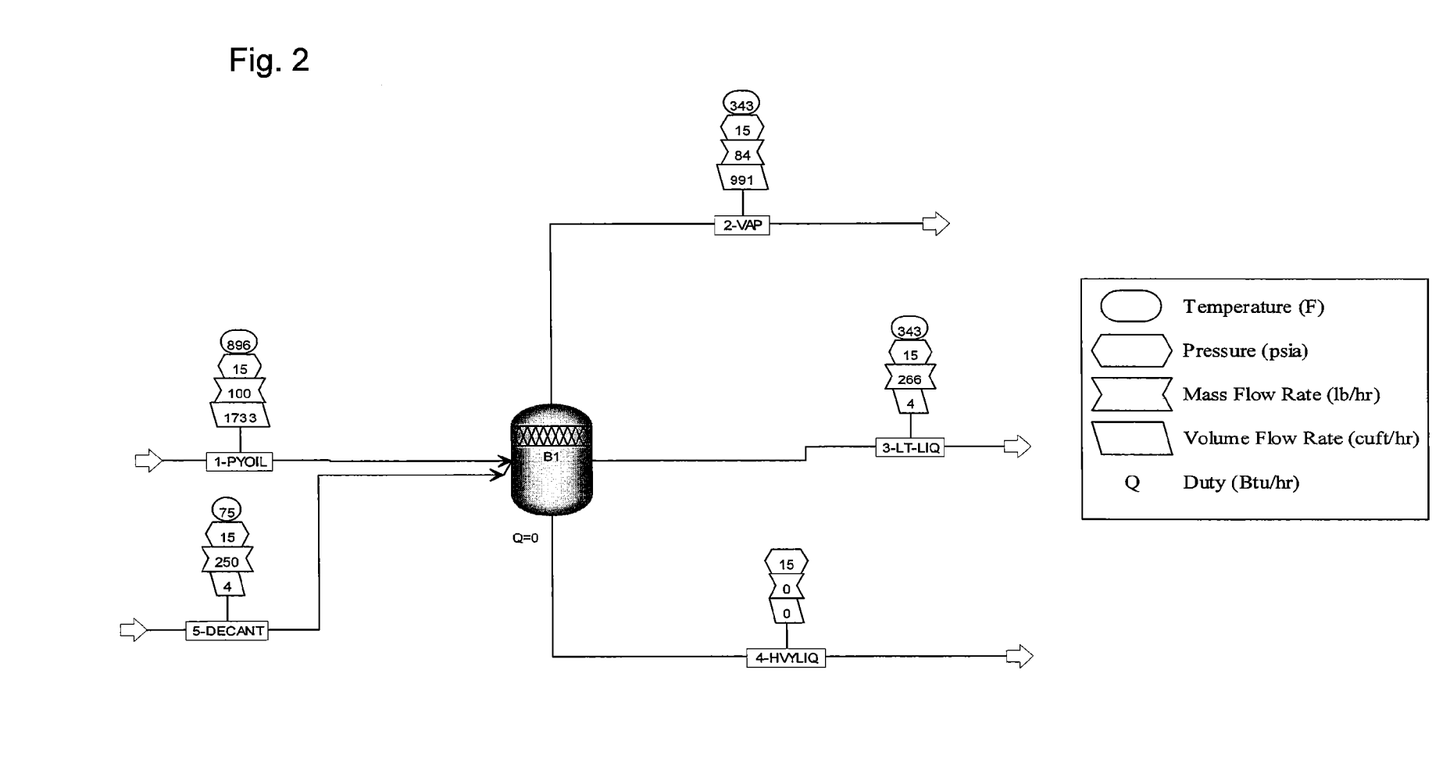
FIG. 2 is a schematic representation of the simulation flow diagram for biomass pyrolysis product quenching with cold quench fluid.

Quenching of hot raw biomass pyrolysis products (480° C.) with cold, aromatic hydrocarbons (25° C.) was simulated in Aspen Plus using the three-phase separator unit operation. A summary flow diagram and overall material balance is depicted in FIG. 2. The aromatic hydrocarbon stream composition consisted of equal mass fractions of naphthalene, pyrene and 1-methylnaphthalene. These compounds were chosen to represent a narrow aromatic extract.

The results in Table 4 demonstrate that selective condensation of certain pyrolysis products could be achieved at about 340° F. (170° C.) with a 2.5:1 solvent:pyrolysis oil ratio, leaving out most of the water, light carboxylic acids, and furanics, as vapors. Although in this example some of the aromatic solvent components do vaporize, subsequent condensation of the entire vapor stream will produce a distinct oil phase rich in solvent components that can be recovered and recycled.

TABLE 4

Simulated quenching results.

| Component | | 1-PYOIL | 2-VAP | 3-LT-LIQ | 4-HVYLIQ | 5-DECANT | 3-LT-LIQ (no solvent) |
|---|---|---|---|---|---|---|---|
| Naphthalene | lb/hr | 0 | 20.69 | 62.64 | 0 | 83.33 | 0 |
| Pyrene | lb/hr | 0 | 0.2 | 83.13 | 0 | 83.33 | 0 |
| 1-methylnaphthalene | lb/hr | 0 | 11.49 | 71.85 | 0 | 83.33 | 0 |
| Guaiacol | lb/hr | 13.33 | 5 | 8.33 | 0 | 0 | 1.82 |
| p-Methoxyphenol | lb/hr | 13.33 | 1.86 | 11.47 | 0 | 0 | 4.91 |
| Lignin oligomer | lb/hr | 13.33 | 0.04 | 13.29 | 0 | 0 | 13.17 |
| Furfural | lb/hr | 13.33 | 7.46 | 5.87 | 0 | 0 | 0.72 |
| Dilactic acid | lb/hr | 13.33 | 5.47 | 7.86 | 0 | 0 | 1.35 |
| Acetic acid | lb/hr | 13.33 | 11.67 | 1.66 | 0 | 0 | 0.19 |

TABLE 4-continued

Simulated quenching results.

| Component | | 1-PYOIL | 2-VAP | 3-LT-LIQ | 4-HVYLIQ | 5-DECANT | 3-LT-LIQ (no solvent) |
|---|---|---|---|---|---|---|---|
| Water | lb/hr | 20 | 19.87 | 0.13 | 0 | 0 | 0.13 |
| | Total | 99.98 | 83.75 | 266.23 | 0 | 249.99 | |

Selective Extraction of Pyrolysis Products

Based on a similar flow diagram as depicted in FIG. 2, liquid-liquid equilibrium calculations were performed at 150° F. (65° C.) extraction temperature and a 8:1 oil:pyrolysis oil ratio. The calculation results in Table 5 demonstrate good recovery of lignin-derived pyrolysis products in the solvent phase. The model compounds associated with products of (hemi)cellulose pyrolysis also showed good recovery in the oil phase. These results indicate that relatively dry pyrolysis oil components could be recovered by direct extraction using an appropriate solvent.

The effect of solvent aromaticity on component partition and recovery can be assessed by comparing the results in Tables 5 and 6. When a completely paraffinic solvent is used (n-hexadecane), the only model pyrolysis oil compounds with any significant solubility in the solvent appear to be furanics (furfural) and light carboxylic acids, while all other compounds concentrate in the aqueous phase. Such a solvent could be employed either for reducing the acidity of the aqueous pyrolysis product or for recovering a dry extract containing furanics and light carboxylic acids. Under low solvent:pyrolysis oil conditions, separation of various lignin pyrolysis products appears possible based on their relative polarity and saturation characteristics of the solvent in use. The results in Table 7 indicate that the lignin oligomer may separate out of the oil fraction for a solvent:pyrolysis oil ratio of 2.5:1. It is not immediately obvious whether this effect is a product of a higher polarity of the oligomer molecule (O:C ratio of 0.32 compared to 0.28 for guaiacol and p-methoxyphenol), stronger interactions with acetic acid (a known lignin solvent, which begins to concentrate in the aqueous phase in this current scenario), or just an artifact of the UNIFAC interaction parameter estimation. It is expected that the critical solvent:pyrolysis oil ratio at which heavier, more polar phenolics may drop out of the oil fraction is a function of the solvent aromaticity and polarizability, and also a function of the light carboxylic acid content in the pyrolysis oil.

TABLE 5

Simulation results for liquid-liquid extraction at 150° F. and 8:1 solvent:pyrolysis oil ratio.

| Component | | 1-PYOIL | 2-VAP | 3-LT-LIQ | 4-HVYLIQ | 5-DECANT |
|---|---|---|---|---|---|---|
| Naphthalene | lb/hr | 0 | 0 | 0 | 266.66 | 266.67 |
| Pyrene | lb/hr | 0 | 0 | 0 | 266.67 | 266.67 |
| 1-methyl-naphthalene | lb/hr | 0 | 0 | 0 | 266.66 | 266.67 |
| Guaiacol | lb/hr | 13.33 | 0 | 0.08 | 13.25 | 0 |
| p-Methoxy-phenol | lb/hr | 13.33 | 0 | 0.08 | 13.25 | 0 |
| Lignin oligomer | lb/hr | 13.33 | 0 | 0.03 | 13.3 | 0 |
| Furfural | lb/hr | 13.33 | 0 | 0.11 | 13.22 | 0 |
| Dilactic acid | lb/hr | 13.33 | 0 | 3.56 | 9.77 | 0 |
| Acetic acid | lb/hr | 13.33 | 0 | 2.37 | 10.97 | 0 |
| Water | lb/hr | 20 | 0 | 17.98 | 2.02 | 0 |
| | Total | 99.98 | 0 | 24.21 | 875.77 | 800.01 |

TABLE 6

Simulation results for paraffinic solvent extraction at 150° F. and 8:1 solvent:pyrolysis oil ratio.

| Component | | 1-PYOIL | 2-VAP | 3-LT-LIQ | 4-HVYLIQ | 5-DECANT |
|---|---|---|---|---|---|---|
| Naphthalene | lb/hr | 0 | 0 | 0 | 0 | 0 |
| Pyrene | lb/hr | 0 | 0 | 0 | 0 | 0 |
| 1-methyl-naphthalene | lb/hr | 0 | 0 | 0 | 0 | 0 |
| Guaiacol | lb/hr | 13.33 | 0 | 0.16 | 13.17 | 0 |
| p-Methoxy-phenol | lb/hr | 13.33 | 0 | 0.16 | 13.17 | 0 |
| Lignin oligomer | lb/hr | 13.33 | 0 | 1.00E-12 | 13.33 | 0 |
| Furfural | lb/hr | 13.33 | 0 | 5.28 | 8.06 | 0 |
| Dilactic acid | lb/hr | 13.33 | 0 | 1.38 | 11.95 | 0 |
| Acetic acid | lb/hr | 13.33 | 0 | 8.66 | 4.67 | 0 |
| Water | lb/hr | 20 | 0 | 0.28 | 19.72 | 0 |
| Naphthalene | lb/hr | 0 | 0 | 799.99 | 0.01 | 800 |
| | Total | 99.98 | 0 | 815.91 | 84.08 | 800 |

TABLE 7

Simulation results for low solvent extraction at 150° F. and 2.5:1 aromatic solvent:pyrolysis oil ratio

| Component | | 1-PYOIL | 2-VAP | 3-LT-LIQ | 4-HVYLIQ | 5-DECANT |
|---|---|---|---|---|---|---|
| Naphthalene | lb/hr | 0 | 0 | 82.69 | 0.64 | 83.33 |
| Pyrene | lb/hr | 0 | 0 | 83.27 | 0.06 | 83.33 |
| 1-methyl-naphthalene | lb/hr | 0 | 0 | 82.9 | 0.43 | 83.33 |
| Guaiacol | lb/hr | 13.33 | 0 | 10.54 | 2.79 | 0 |
| p-Methoxy-phenol | lb/hr | 13.33 | 0 | 10.54 | 2.79 | 0 |
| Lignin oligomer | lb/hr | 13.33 | 0 | 0.71 | 12.63 | 0 |
| Furfural | lb/hr | 13.33 | 0 | 11.25 | 2.08 | 0 |
| Dilactic acid | lb/hr | 13.33 | 0 | 2.03 | 11.3 | 0 |
| Acetic acid | lb/hr | 13.33 | 0 | 5.06 | 8.28 | 0 |
| Water | lb/hr | 20 | 0 | 1.19 | 18.81 | 0 |
| | Total | 99.98 | 0 | 290.18 | 59.81 | 249.99 |

The above simulations indicate that highly aromatic fractions may be effective direct quench fluids and at the same time selectively dissolve certain compounds present in the hot product of biomass fast pyrolysis. At elevated solvent:pyrolysis product ratios, certain low value refinery streams could be used to quantitatively extract biomass pyrolysis products out of the aqueous phase.

Based on simulations employing several model compounds using Aspen Plus® process simulation software, effective quenching of hot, raw biomass pyrolysis oil appears feasible in the presence of a cold hydrocarbon solvent at relatively modest solvent-to-pyrolysis product rations (2.5:1). Under these conditions, the simulation software indicates that certain compounds obtained from biomass pyrolysis may selectively condense in a strongly aromatic solvent. Quantitative recovery of phenolic and furanic compounds appears feasible at elevated oil:pyrolysis product ratios (8:1) and low temperatures (150° F.) while at low solvent ratios the most polar phenolics appear to dissolve preferentially in the acidic, aqueous phase, while lighter, less polar phenolics remain in the oil phase. Paraffinic solvents appear to selectively dissolve furanics and light carboxylic acids leaving heavier anhydrosugars and phenolics in the aqueous phase.

The results from this simulation give a qualitative image of the phase behavior of biomass pyrolysis products in the presence of hydrocarbon solvents. Any heavy, highly aromatic solvents with a wide boiling point range may be used as solvents for phenolic, lignin-derived compounds than for light carboxylic acids.

The invention is useful in providing at least the following benefits to the biomass pyrolysis process: (i) provides fast quenching rates for the hot pyrolysis product in order to prevent undesired polycondensation and thermal degradation; (ii) further prevents polycondensation by instantly diluting reactive components in the pyrolysis product; (iii) enhances product recovery by absorbing or dissolving some of the lighter components that would otherwise escape with the overhead product stream; (iv) facilitates initial product separation into: water vapor, light oxygenates and non-condensables; a solvent-soluble liquid product; a solvent-insoluble liquid product; a particulate/tar sludge.

Biomass pyrolysis is recognized as one of the most economically attractive routes for producing cellulosic biofuels as defined by the Renewable Fuel Standard of 2007. It is very likely that a pyrolysis-based technology will become the commercial solution to meeting the fuel blending obligations set forth by this legislation. This invention has the prospect to see widespread commercial application, especially when biomass pyrolysis is co-located with existing refineries.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise. It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

That which is claimed:

1. A process comprising:
   a) subjecting a biomass feedstock to a pyrolysis treatment to provide a biomass pyrolysis effluent stream comprising
      i) wet pyrolysis oil comprising liquid pyrolysis oil and water,
      ii) non-condensable gases, and
      iii) char;
   b) separating at least 70% of said char from said biomass pyrolysis effluent stream to form a raw biomass pyrolysis product;
   c) feeding said raw biomass pyrolysis product into an absorption and quench apparatus; and
   d) directly contacting said raw biomass pyrolysis product with a cold quench fluid feed in said absorption and quench apparatus,
      wherein said raw biomass pyrolysis product is cooled and condensed while at least one separable component from said raw biomass pyrolysis product is absorbed and/or diluted by said cold quench fluid feed.

2. The process according to claim 1, wherein said cold quench fluid is a solvent selected from the group consisting of hydrocarbon solvents, substituted hydrocarbon solvents and any combination thereof.

3. The process according to claim 1, wherein said separable component is derived from said wet pyrolysis oil or said char.

4. The process according to claim 2, wherein said separable component is absorbed, dissolved or combinations thereof, in said solvent under a solvent-to-wet-pyrolysis-oil ratio equal to or greater than 1:1, wherein more than 50% of the said separable components separate outside the solvent phase.

5. The process according to claim 2, wherein said solvent to said wet-pyrolysis-oil ratio is between 1:100 to 100:1.

6. The process according to claim 2, wherein said solvent to said wet-pyrolysis-oil ratio is between 1:2 to 20:1.

7. The process according to claim 1, wherein said separable component is selected from the group consisting of furans, substituted furans, anhydrosugars, phenolic compounds, polyphenolic compounds, carboxylic acids, carboxylates, substituted carboxylic acids, aldehydes, ketones, substituted aldehydes or ketones, alcohols, polyols, substituted alcohols or polyols, water, char and any combination thereof.

8. The process according to claim 1, wherein said cold quench fluid feed is a thermally stable aromatic solvent comprising at least 30% aromatic hydrocarbon.

9. The process according to claim 1, wherein said cold quench fluid feed is a thermally stable aliphatic solvent comprising equal to or less than 30% aromatic hydrocarbon.

10. The process according to claim 8, wherein said aromatic solvent is aromatic extracts from solvent extraction of vacuum distillates.

11. The process according to claim 8, wherein said aromatic solvent is a cracked refinery stock selected from the group consisting of heavy cycle oils, heavy coker gas oils, heavy visbreaking distillates, heavy thermal cracking distillates clarified catalytic cracking decant oils and any combination thereof.

12. The process according to claim 9, wherein said thermally stable aliphatic solvent is or more extracts from the solvent extraction of vacuum residues.

13. The process according to claim 9, wherein said aliphatic solvent is a refinery stock selected from vacuum gas oil, intermediate and heavy vacuum distillates, naphthenic oils, heavy hydrocracker distillates, heavy distillates from hydroprocessing and any combination thereof.

14. The process according to claim 1 wherein said step d) is carried out via a liquid-vapor contacting unit in said absorption and quench apparatus.

15. The process according to claim 1, wherein the temperature of said biomass pyrolysis effluent stream is at least 300° F. (149° C.).

16. The process according to claim 1 wherein said temperature of said cold quench fluid feed is less than 850° F. (454° C.).

17. The process according to claim 1, wherein step b) is carried out via a separation apparatus selected from the group consisting of cyclone, wash column, absorption column and any combination thereof.

\* \* \* \* \*